Sept. 6, 1938.  P. M. CARTER ET AL  2,129,083
GEAR SHIFTING MECHANISM
Filed June 1, 1936
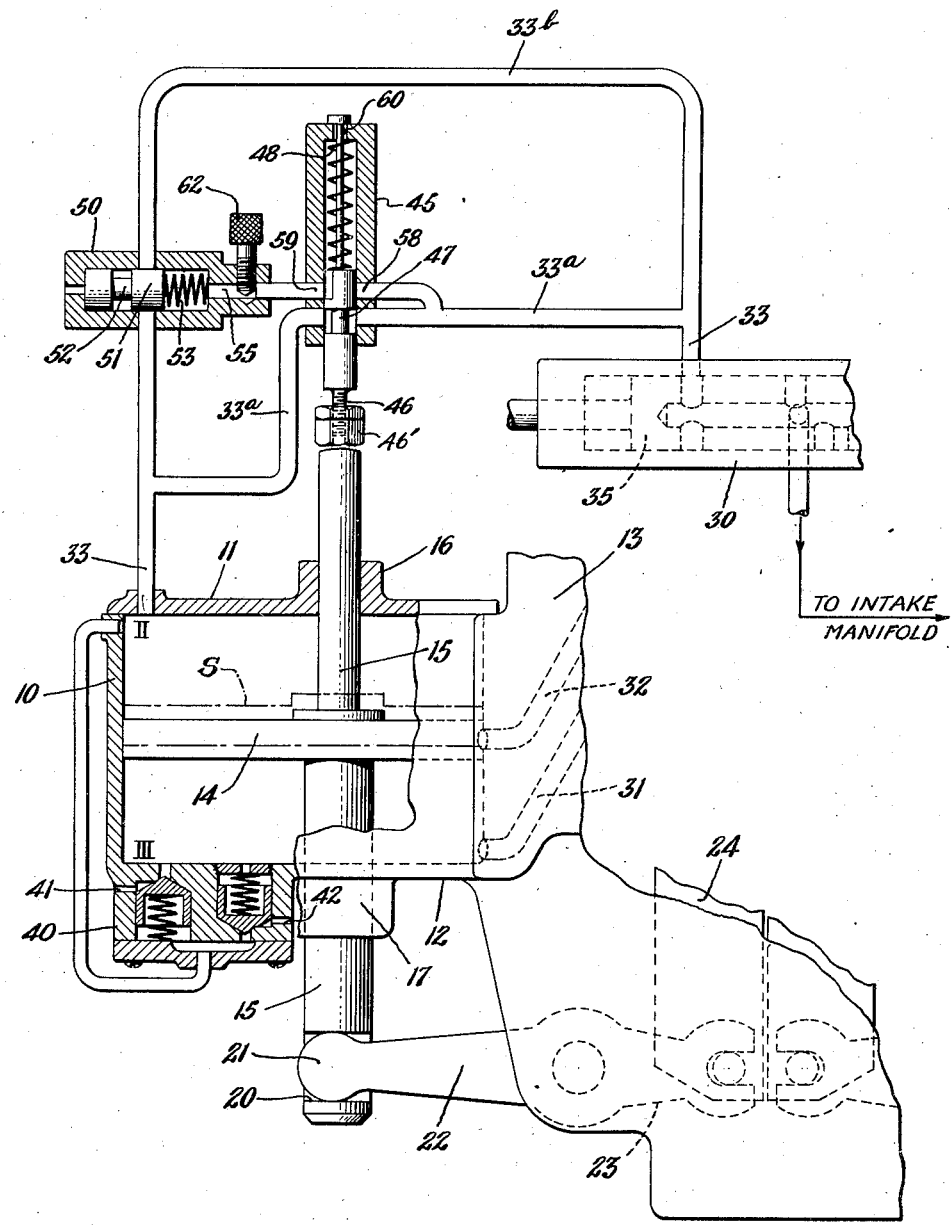
INVENTORS
P. M. Carter and N. F. Linsley
BY
Morgan, Finnegan and Durham
ATTORNEYS Patented Sept. 6, 1938

2,129,083

UNITED STATES PATENT OFFICE 2,129,083

GEAR SHIFTING MECHANISM

Philip M. Carter, White Plains, N. Y., and Douglas F. Linsley, Norwalk, Conn., assignors to Vaco Products, Inc., Jersey City, N. J., a corporation of Delaware Application June 1, 1936, Serial No. 82,766

9 Claims. (Cl. 121—38)

The present invention relates to fluid pressure motors and more particularly to a novel and improved suction operated motor for the shifting of the transmission gears of an automobile transmission.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawing, referred to herein and constituting a part hereof, illustrates one embodiment of the invention, and together with the description, serves to explain the principles of the invention.

The single figure of the drawing is a diagrammatic representation of a fluid pressure operated motor and its controlling valve, as constructed in accordance with the present invention, many of the parts being shown in section and certain other parts being broken away.

The present invention has for its object the provision of a fluid pressure operated motor having control means for varying the speed of travel of a piston or other moving element during certain portions of its travel. Another object of the invention is the provision of a suction operated cylinder and piston provided with means for slowing the piston during an intermediate portion of its travel in the cylinder. Still another object of the invention is the provision of a novel and improved suction operated motor for the shifting of the transmission gears of a selective sliding gear transmission of the synchro-mesh type in which synchronizing clutches are provided to prevent clashing of the gears as they are slid into mesh.

In fluid pressure operated gear shifting devices of the type heretofore generally known, the piston connected for shifting the gears moves at substantially a uniform speed throughout its stroke, with the result that when this type of motor is used for shifting the gears of a synchro-mesh transmission from a higher to a lower speed (a lower to a higher gear ratio) either the synchronizing clutch is overloaded, the shifting operation as a whole must be slowed down to a point where it is sluggish, or the gears clash and thus defeat one of the principal objects of the synchro-mesh transmission.

In accordance with the present invention, and where suction is used as the actuating force, full suction is first applied to one side of the piston to move the gears or their positive clutches out of meshed position, and the full suction is continued until the shifting member is approximately in neutral position. In this position, the suction is interrupted and is thereupon applied to a suction-operated valve through a restricted duct and after a short interval of time, this valve is opened so as to re-apply the full suction to the piston. During the moment of interrupted suction, the gears are synchronized, as this interruption corresponds in position to the synchronizing position of the shifting member, and in the illustrated embodiment, the interruption is controlled by the position of the piston which is connected to the shifting member. Means are also provided for variably restricting the duct leading to the suction-operated valve so that the period of delay may be varied depending upon the maximum speed at which it is desired to shift gears.

In general, the control means of the present invention need be applied only to the intermediate speed of a three-speed transmission, as there is a relatively small duty on the synchronizing clutches when shifting from intermediate to third speed, and it is only seldom desired to shift from intermediate to low speed. This arrangement thus serves to control the shift from first or third to intermediate speed.

It will be understood that the foregoing general description and the following detailed description as well, are exemplary and explanatory of the invention but are not restrictive thereof.

Referring now in detail to the illustrative embodiment of the invention, as shown in the accompanying drawing, the fluid pressure operated motor is in many respects similar to that shown in the prior patent to Douglas F. Linsley, No. 1,733,502 and comprises a double-ended cylinder 10 having end walls 11 and 12 mounted rigidly with respect to the transmission casing 13. Within the cylinder is a piston 14 connected to a piston rod 15 passing through air-tight guides 16 and 17 in the end walls 11 and 12 of the cylinder. At one end the piston rod is slotted, as at 20, to receive the rounded end 21 of a pivoted lever 22 having its other end 23 connected to the gear shifting rod 24 for the second and third speed gears (not shown) in a conventional manner. By moving the piston forwardly, the gear shifting fork is moved rearwardly to shift the gears into second speed position while by moving the piston rearwardly the gears are shifted into high or third speed position.

A selector valve 30 of conventional construction is provided for selectively applying suction to the third speed duct 31, neutral duct 32, or second speed duct 33 by sliding the valve slide 35 to one or the other of its positions, and the application of suction to any one of these ducts causes movement of the piston 14 and lever 22 to the corresponding position.

As shown in the prior Patent No. 1,733,502, means are provided for selectively admitting air to one or the other end of the cylinder 10 as suction is applied to the opposite end, and these means comprise the automatic valve 40 mounted on the cylinder end wall 12 and controlling the admission of air through ducts 41 or 42 by the application of suction through these ducts. That is, when suction is applied to duct 31 to move the piston to third speed position, air is admitted through the duct 42 by the operation of these automatic valves, thereby allowing a greater pressure difference to be established between the two sides of the piston 14 than would otherwise be the case.

For controlling and varying the speed of travel of the piston 14 from its third speed to its second speed position, and for causing it to be slowed as it passes the synchronizing point, duct 33 is branched intermediate its ends, as at 33a and 33b, and in branch 33a is provided a valve 45 having a plunger 46 adapted to contact with the second speed end of piston rod 15. Plunger 46 is formed with a reduced portion 47 serving as a valve duct to open or close the branch 33a, and a spring 48 is provided for normally holding plunger 46 in valve opened position, as shown in the drawing. For varying the operation of the device, the end of plunger 46 may be provided with a threaded cap 46' so that the engagement of the parts 15 and 46 may be varied to change the position at which the piston 16 is checked.

In the other branch 33b is provided a suction operated valve 50 comprising a valve plunger 51 having a reduced portion 52, and this plunger is normally held in closed position by spring 53, but may be moved to open position by the application of suction to one end of the plunger 51 through duct 55. Duct 55 is connected to branch 33a through valve 45 which is provided with ports 58 and 59. Port 58 is normally closed by the end of plunger 46 while the same end of the plunger is cut away so that port 59 is normally open to atmosphere through the vent 60 at the end of valve 45. Means are also provided for variably restricting the duct 55, and for this purpose a needle valve 62 is provided in the end of valve 50 so as to restrict the flow of air from the end of plunger 51.

With the parts as shown in the figure of the drawing, the plunger 46 is engaged by the forward end of piston rod 15 as the piston passes neutral in moving towards second speed position.

In the operation of the illustrative embodiment, and assuming that the gears are to be shifted to second speed position, by movement of the piston from either high speed or neutral position under the suction as applied through pipes 33, 33a and valve 47, the end of the piston rod 15 engages plunger 46 and on continuing the application of suction through duct 33 and branch 33a to the forward end of cylinder 10, the plunger 46 is moved to shut off branch 33a, thereby interrupting the application of suction to the forward end of cylinder 10 and thereby checking or stopping the movement of piston 15 at the synchronizing point.

As branch 33a is closed, duct 47 opens port 58 to port 59, thereby allowing suction to be applied through duct 55 and the controllable restricting valve 62 to the end of plunger 51, and again applying suction to the forward end of piston 14 so that its rapid movement is resumed. This manner of operation assures that the piston 14 moves rapidly up to its neutral position and to the position indicated by the dot and dash lines S, at which point the synchronizing clutches in the transmission are engaged and synchronization of the gears is started. At this point the application of suction is discontinued momentarily, allowing a sufficient and controlled interval for complete synchronization of the gears, the length of this interval being determined by the smallness of the restricting valve 62.

By adjusting the restricting valve 62 to a larger opening, the synchronizing interval may be reduced, thereby allowing the gears to crash if the shifting operation is attempted at too high a speed with a resultant warning to the driver that he is unduly burdening the synchronizers of the transmission. The operation of valve 45 may be timed by the threaded cap 46' of plunger 46, thus adapting the point of synchronism of the device to the requirements of the particular transmission and driver.

The invention in its broader aspects is not limited to the specific mechanism shown and described but departures may be made therefrom within the scope of the accompanying claims without departing from the principles of the invention and without sacrificing its chief advantages.

What we claim is:—

1. In a suction operated motor, the combination of a cylinder and a piston, a suction duct having two valves in parallel therein and connected to one end of the cylinder, means for operating one of the valves by suction and the other valve being alternatively openable to the cylinder or first valve to operate it by suction and means for operating said other valve by the piston.

2. In a suction operated motor, the combination of a cylinder and a piston, a suction duct having two valves in parallel therein and connected to one end of the cylinder, means for operating one of the valves by suction and the other valve being operated by the piston, a passage controlled by the piston operated valve through which suction may be applied to operate the suction valve whereby the suction applied to the cylinder is first cut off and is then restored through sequential operation of the valve means.

3. In a suction operated motor, the combination of a cylinder and a piston, a suction duct having two valves in parallel therein and connected to one end of the cylinder, means for operating one of the valves by suction and the other valve being operated by the piston, a passage controlled by the piston operated valve through which suction may be applied to operate the suction valve, means normally holding said suction operated valve closed, and means normally holding the piston operated valve open to the cylinder whereby suction is first applied to the cylinder, is momentarily interrupted and applied to the suction operated valve to open it and restore suction to the cylinder.

4. In a suction operated motor, the combination of a cylinder and a piston, a suction duct having two valves in parallel therein and connected to one end of the cylinder, means for operating one of the valves by suction and the other valve being alternatively openable to the cylinder or first valve, means for operating said other valve by the piston, and means for varying the relation of the piston and other valve.

5. In a suction operated motor, the combination of a cylinder and a piston, a suction duct having two valves in parallel therein and connected to one end of the cylinder, means for operating one of the valves by suction and the other valve being operated by the piston, a passage controlled by the piston operated valve through which suction may be applied to operate the suction valve, means normally holding said suction operated valve closed, means normally holding the piston operated valve open to the cylinder whereby suction is first applied to the cylinder, is momentarily interrupted and applied to the suction operated valve to open it and restore suction to the cylinder, and means for varying the relation of the piston and other valve.

6. In a fluid pressure operated gear shifter having a cylinder and piston and a selector valve controlling the application of fluid pressure to the cylinder, said piston being connected for moving the shifter fork of a synchromesh transmission, the combination of an air duct having two valves in parallel and in series with the selector valve and connected to one end of the cylinder, means for operating one of the two valves by the piston and means for operating the other of the two valves by fluid pressure controlled by the first of the two valves.

7. In a fluid pressure operated gear shifter having a cylinder and piston and a selector valve controlling the application of fluid pressure to the cylinder, said piston being connected for moving the shifter fork of a synchromesh transmission, the combination of an air duct having two valves in parallel and in series with a selector valve and connected to one end of the cylinder, a passageway from one of the two valves to the other, means for operating one of the valves by fluid pressure applied through the passageway and other valve and means for operating the other of said two valves by the piston rod.

8. In a suction operated gear shifter having a cylinder and piston and a selector valve controlling the application of suction to the cylinder, said piston being connected for moving the shifter fork of a synchromesh transmission, the combination of an air duct having two valves in parallel and in series with a selector valve and connected to one end of the cylinder, a passageway from one of the two valves to the other, means for operating one of the valves by suction applied through the passageway and other valve and means for operating the other of said two valves by the piston rod.

9. In a fluid pressure operated gear shifter having a cylinder and piston and a selector valve controlling the application of fluid pressure to the cylinder, said piston being connected for moving the shifter fork of a synchromesh transmission, the combination of an air duct having two valves in parallel and in series with a selector valve and connected to one end of the cylinder, a regulably restricted passageway from one of the two valves to the other, means for operating one of the valves by fluid pressure applied through the passageway and other valve, means for operating the other of said two valves by the piston rod, and means for varying the relation of the other valve and piston.

PHILIP M. CARTER.
DOUGLAS F. LINSLEY.